Patented Jan. 10, 1939

2,143,829

UNITED STATES PATENT OFFICE 2,143,829

WATER SOLUBLE DERIVATIVE OF P-AMINO-BENZENESULPHONAMIDE

Joseph Ebert, Westmont, N. J., assignor to The Farastan Company, Philadelphia, Pa., a corporation of Pennsylvania No Drawing. Application September 15, 1937, Serial No. 163,915

2 Claims. (Cl. 260—503)

This invention relates to a new derivative of p-aminobenzenesulphonamide. It relates more particularly to a salt of p-aminobenzenesulphonamide with camphorsulphonic acid, which salt is readily soluble in water and hence is advantageous in therapeutics for the treatment of various infections caused by cocci.

p-Aminobenzenesulphonamide has been recognized as having great value for the treatment of coccus infections; but its use has been subject to serious disadvantages in view of its slight solubility in water, approximately one part of this compound being soluble in 160 parts of water at 25° C. Because of this low solubility, the oral administration of the compound in aqueous solution is impractical, so that the compound is ordinarily administered orally in tablet form. This low solubility is even more objectionable when the compound is used in injection therapy, as it has been found that to obtain therapeutic results, for example, for treating meningococcic infections, as much as 0.08 to 0.24 gram of the substance must be injected intraspinally, requiring the injection of as much as 10 to 30 cc. of liquid. For effective therapeutic results with subcutaneous injection, from 0.8 to 3.2 grams of the material must be injected every twelve hours, requiring the subcutaneous injection of from 100 to 400 cc. of solution. Injections of such large amounts of liquid are impractical and often dangerous.

The nature of the new camphorsulphonic acid salt of p-aminobenzenesulphonamide is such that when administered it readily splits to reform the p-aminobenzenesulphonamide and the acid, thus retaining the therapeutic properties of the p-aminobenzenesulphonamide with the attendant advantages due to ready solubility in water, which include oral administration in dissolved form using relatively little water, injection of therapeutic doses without including objectionable quantities of liquid, and improved assimilation and faster circulation.

The camphorsulphonate of p-aminobenzenesulphonamide has a high solubility in water, one part of it dissolving in about two parts of water at 25° C. and it contains approximately 42.5% of p-aminobenzenesulphonamide, such that therapeutic doses of the salt may be readily administered, either orally or by injection, in aqueous solution without administration of excess or objectionable quantities of liquid.

The camphorsulphonate of p-aminobenzenesulphonamide also has other valuable properties therapeutically. When administered, the compound breaks up to form p-aminobenzenesulphonamide and the camphorsulphonic acid. The camphorsulphonic acid is eliminated through the urinary tract practically unchanged, that is, in acid form, while the p-aminobenzenesulphonamide is eliminated in the form of its acetyl derivative, that is, in coupled form. As a result, the acidity of the urine is increased, a factor of great value in the treatment of infections of the genitourinary tract. However, if the solutions are used for injection purposes, they are advantageously buffered with one of the commonly used buffer salts to adjust the pH of their solution from about 7.0 to about 7.4, to avoid irritation. Such buffering materials as disodium acid phosphate and sodium borate may be advantageously used for this purpose. Highly alkaline buffering materials, such as sodium carbonate, should be avoided, as their use might result in the precipitation of the p-aminobenzenesulphonamide.

The invention will be further illustrated by the following example, which describes the preparation of the salt of p-aminobenzenesulphonamide with d-camphorsulphonic acid.

*Example.*—172 parts of p-aminobenzenesulphonamide and 232 parts of d-camphorsulphonic acid are mixed with 800 parts of distilled water or 2000 parts of methanol. The mixture is stirred for several minutes until a complete solution is formed, after which it is set aside for a period of six to twelve hours. The solvent is then removed by evaporation, preferably under a vacuum, at low temperature, to insure the production of a compound of high purity. If the evaporation is carried out at atmospheric pressure, a slightly more impure compound is produced. The salt obtained may be purified by recrystallization from alcohol or water, advantageously with the use of a decolorizing agent such as activated carbon, filtrol, etc. It crystallizes in fine needles, melting at approximately 180 to 182° C. with decomposition. Instead of using the sulphonic acid of natural (d-) camphor, the sulphonic acid of synthetic (l-) camphor may be used with the same results.

The new compound has a high solubility in water, one part of it dissolving in two parts of water at 25° C. Analysis shows the presence of 42.5% p-aminobenzenesulphonamide in the compound.

In general the camphorsulphonate of p-aminobenzenesulphonamide is prepared by reacting camphorsulphonic acid with p-aminobenzenesulphonamide in a suitable solvent, such as the water or methanol of the example, although other solvents, such as ethanol, etc., may be used, as the solvent does not enter into the reaction, and merely enables the neutralization reaction to take place.

I claim:

1. The camphorsulphonate of p-aminobenzenesulphonamide.

2. The method of preparing a water soluble compound of p-aminobenzenesulphonamide which comprises reacting p-aminobenzenesulphonamide with camphorsulphonic acid.

JOSEPH EBERT.